(12) United States Patent
Jung et al.

(10) Patent No.: US 11,928,469 B2
(45) Date of Patent: Mar. 12, 2024

(54) APPARATUS AND METHOD WITH NEURAL NETWORK OPERATION

(71) Applicants: SAMSUNG ELECTRONICS CO., LTD., Suwon-si (KR); Seoul National University R&DB Foundation, Seoul (KR)

(72) Inventors: Hanwoong Jung, Seoul (KR); Soonhoi Ha, Seoul (KR); Donghyun Kang, Seoul (KR); Duseok Kang, Seoul (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 61 days.

(21) Appl. No.: 17/863,662

(22) Filed: Jul. 13, 2022

(65) Prior Publication Data

US 2023/0140145 A1 May 4, 2023

(30) Foreign Application Priority Data

Nov. 2, 2021 (KR) .................. 10-2021-0148669

(51) Int. Cl.
*G06N 3/063* (2023.01)
*G06F 7/50* (2006.01)
*G06F 9/30* (2018.01)

(52) U.S. Cl.
CPC ............ *G06F 9/30105* (2013.01); *G06F 7/50* (2013.01); *G06N 3/063* (2013.01)

(58) Field of Classification Search
None
See application file for complete search history.

(56) References Cited

U.S. PATENT DOCUMENTS

| 2007/0047690 A1* | 3/2007 | Zhao ..................... H03L 7/113 375/376 |
| 2020/0234099 A1 | 7/2020 | Wang et al. |
| 2021/0096823 A1 | 4/2021 | Li et al. |
| 2021/0173659 A1* | 6/2021 | Yuan ..................... G06N 3/063 |

OTHER PUBLICATIONS

Hu, Jie, et al. "Squeeze-and-excitation networks." *Proceedings of the IEEE conference on computer vision and pattern recognition.* vol. 4, arXiv: 1709.01507v4 [cs.CV] May 16, 2019 (2018). pp 1-13.

* cited by examiner

*Primary Examiner* — Michael Sun
(74) *Attorney, Agent, or Firm* — NSIP Law (57) ABSTRACT

A neural network operation apparatus and method are disclosed. The neural network operation apparatus may include an adder configured to perform addition of data for performing a neural network operation and main data, a first multiplexer configured to output one of an output result of the adder and the main data based on a reset signal, a second multiplexer configured to output one of the main data and a quantization result of the data based on a phase signal, and a controller configured to control the first and second multiplexers by generating the reset signal and the phase signal.

20 Claims, 10 Drawing Sheets

```
1: for (int xx = 0 ; xx < W_out ; xx += Tx){ // main datapath, Phase =1
2:    for (int nn = 0; nn < C_out; nn += N){
3:    int ox = xx / sx;
4:       for (int x = xx ; x < xx + Tx ; x+= sx){
5:          int oy = 0;
6:          for (int y = 0 ; y < H_out; y+= sy){
7:             for (int n = nn ; n < nn + N; n++){ // computed in paralledl (CIMs)
8:                O_TYPE out = Activation(kernel(x, y, n));
9:                update(reduction_buffer[n], out); // Pipelined Reduction Module
10:               output[ox][oy][n] = out;
10:   } oy++; } ox++;
11:} } }
12:for (int n = 0; n < C_out; n++) // Phase =2, Reduction Module
13:   reduction_output[n] = reduction_buffer[n];
```

APPARATUS AND METHOD WITH NEURAL NETWORK OPERATION

CROSS-REFERENCE TO RELATED APPLICATIONS

This application claims the benefit under 35 USC § 119(a) of Korean Patent Application No. 10-2021-0148669, filed on Nov. 2, 2021, in the Korean Intellectual Property Office, the entire disclosure of which is incorporated herein by reference for all purposes.

BACKGROUND

1. Field

The following description relates to an apparatus and method with a neural network operation.

2. Description of Related Art

A neural network operation includes various operations corresponding to various layers. For example, the neural network operation may include a convolution operation and a non-convolution operation.

The non-convolution operation may include a reduction operation, and global pooling, which is one of reduction operations, and may be used to compress information of an input feature map having a significantly large spatial dimension such as a squeeze-and-excitation network.

To process information of an input feature map having a large spatial dimension, an operation may need to be performed by reading all values of two-dimensional feature maps corresponding to a channel per one output pixel.

In cases where hardware is added to perform a reduction operation, a control system considering controlling a main datapath and a reduction module may need to be added, and accordingly, a support of a compiler or software to generate a control signal may be desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation apparatus includes an adder configured to perform addition of data for performing a neural network operation and main data, a first multiplexer configured to output one of an output result of the adder and the main data based on a reset signal, a second multiplexer configured to output one of the main data and a quantization result of the data based on a phase signal, and a controller configured to control the first and second multiplexers by generating the reset signal and the phase signal.

The neural network operation apparatus may further include an internal storage configured to store the data for performing the neural network operation.

The neural network operation apparatus may further include a first register configured to receive the data from the internal storage and store the data, a second register configured to receive the main data and store the main data, and a third register configured to store the output of the first multiplexer.

The neural network operation apparatus may further include a quantizer configured to generate the quantization result by quantizing the data based on a quantization factor.

The internal storage may be further configured to store the data based on a channel index indicating a position of an output tensor of the data.

The controller may be further configured to update the internal storage based on whether the main data is valid.

The phase signal may include a first phase signal to cause the neural network operation apparatus not to perform an operation, a second phase signal to output the main data and update the internal storage, and a third phase signal to output the quantization result.

The controller may be further configured to change the phase signal to the third phase signal when outputting of the main data is completed, and receive the data from the internal storage, based on a channel index, and output the data.

The controller may be further configured to initialize the internal storage to the data based on the reset signal.

The controller may be further configured to initialize the internal storage by generating the reset signal when a first output of a filter corresponding to the main data is generated.

In another general aspect, a neural network operation method includes performing addition of data for performing a neural network operation and main data, generating a reset signal to select one of an addition result and the main data, generating a phase signal to select one of the main data and a quantization result of the data, outputting one of the addition result and the main data based on the reset signal, and outputting one of the main data and the quantization result of the data based on the phase signal.

The neural network operation method of may further include receiving the data from an internal storage in which the data is stored and storing the data, receiving and storing the main data, and storing selected one of the addition result and the main data.

The outputting of the one of the main data and the quantization result of the data based on the phase signal may include generating the quantization result by quantizing the data based on a quantization factor.

The neural network operation method of may further include storing the data based on a channel index indicating a position of an output tensor of the data.

The neural network operation method may further include updating an internal storage configured to store the data based on whether the main data is valid.

The phase signal may include a first phase signal that causes a neural network operation apparatus not to perform an operation, a second phase signal to output the main data and update an internal storage configured to store the data, and a third phase signal to output the quantization result.

The neural network operation method may further include changing the phase signal to the third phase signal when outputting of the main data is completed, and receiving the data from the internal storage based on a channel index and outputting the data.

The neural network operation method may further include initializing an internal storage to the data based on the reset signal, the internal storage being configured to store the data.

The generating of the reset signal may include initializing an internal storage configured to store the data, by generating the reset signal when a first output of a filter corresponding to the main data is generated.

A non-transitory computer-readable storage medium may store instructions that, when executed by a processor, configure the processor to perform the method above.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Figure 1:
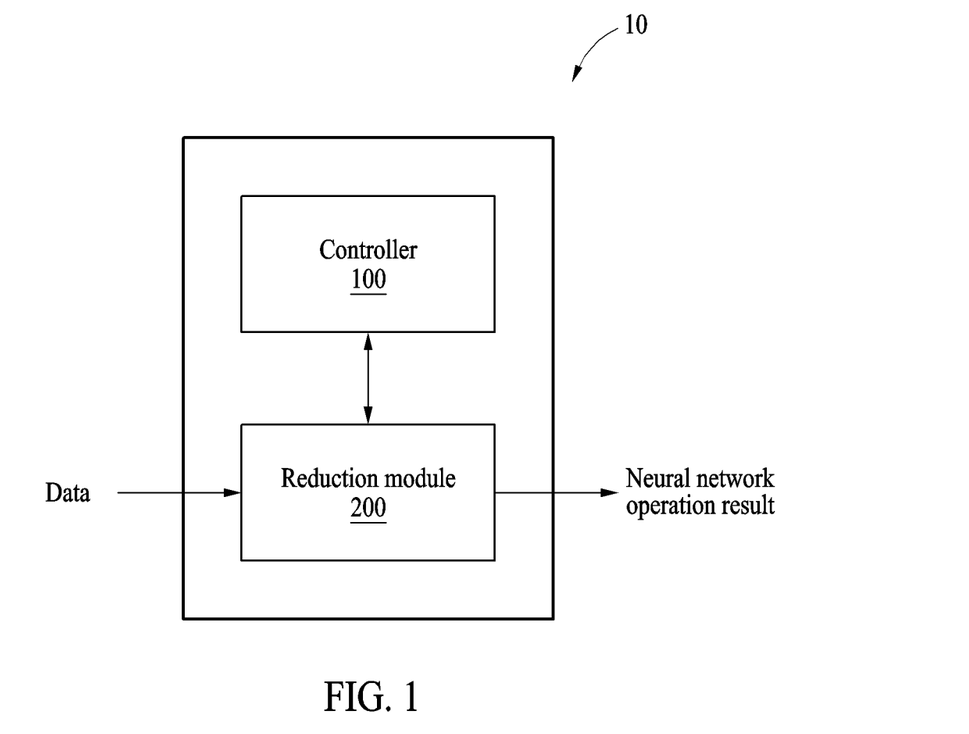
FIG. 1 illustrates an example of a neural network operation apparatus.

FIG. 1 illustrates an example of a neural network operation apparatus.

Referring to FIG. 1, a neural network operation apparatus 10 may perform a neural network operation. The neural network operation apparatus 10 may generate a neural network operation result by processing data using a neural network by receiving data.

The neural network operation apparatus 10 may be added, in a pipeline form, to a neural processing unit (NPU) system that uses an adder tree. The neural network operation apparatus 10 may efficiently perform a reduction operation by sequentially receiving outputs of a main datapath.

The neural network operation apparatus 10 may generate a control signal to perform a reduction operation by separating processing logic into two branches. The control signal may include a reset signal and a phase signal. The neural network operation apparatus 10 may store an input value in an internal storage by generating a reset signal to reduce overhead that is consumed to initialize the internal storage for storing a reduction operation result.

The neural network may be a general neural network model that has the ability to solve a problem, where artificial neurons (nodes) forming the network through synaptic combinations change a connection strength of synapses through training.

The neurons of the neural network may include a combination of weights or biases. The neural network may include one or more layers each including one or more neurons or nodes. The neural network may infer a desired result from a predetermined input by changing the weights of the neurons through training.

The neural network may include a deep neural network (DNN). The neural network may include a convolutional neural network (CNN), a recurrent neural network (RNN), a perceptron, a multilayer perceptron, a feed forward (FF), a radial basis function (RBF) network, a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The neural network operation apparatus 10 may be implemented in a personal computer (PC), a data server, and/or a portable device.

The portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smart watch, a smart band, or a smart ring.

The neural network operation apparatus 10 may include a controller 100 and a reduction module 200. The controller 100 may control the reduction module 200 by generating a control signal to control the reduction module 200. The controller 100 may generate a reset signal and a phase signal.

The controller 100 may include a processor. The processor may process data stored in a memory. The processor may execute computer-readable code (for example, software) stored in the memory and instructions triggered by the processor.

The processor may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The reduction module 200 may generate a neural network operation result by performing a neural network operation by processing data. The reduction module 200 may perform a reduction operation. The reduction operation may include a pooling operation. For example, the pooling operation may include a global pooling operation.

The neural network operation apparatus 10 may efficiently perform a reduction operation while reducing overhead in an operation by performing the reduction operation using the reduction module 200. The neural network operation apparatus 10 may internally update the reduction module 200 with a result of global pooling by inputting an output value of a main datapath, and may simultaneously perform operations of two layers by bypassing main data received from the main datapath.

Figure 2:
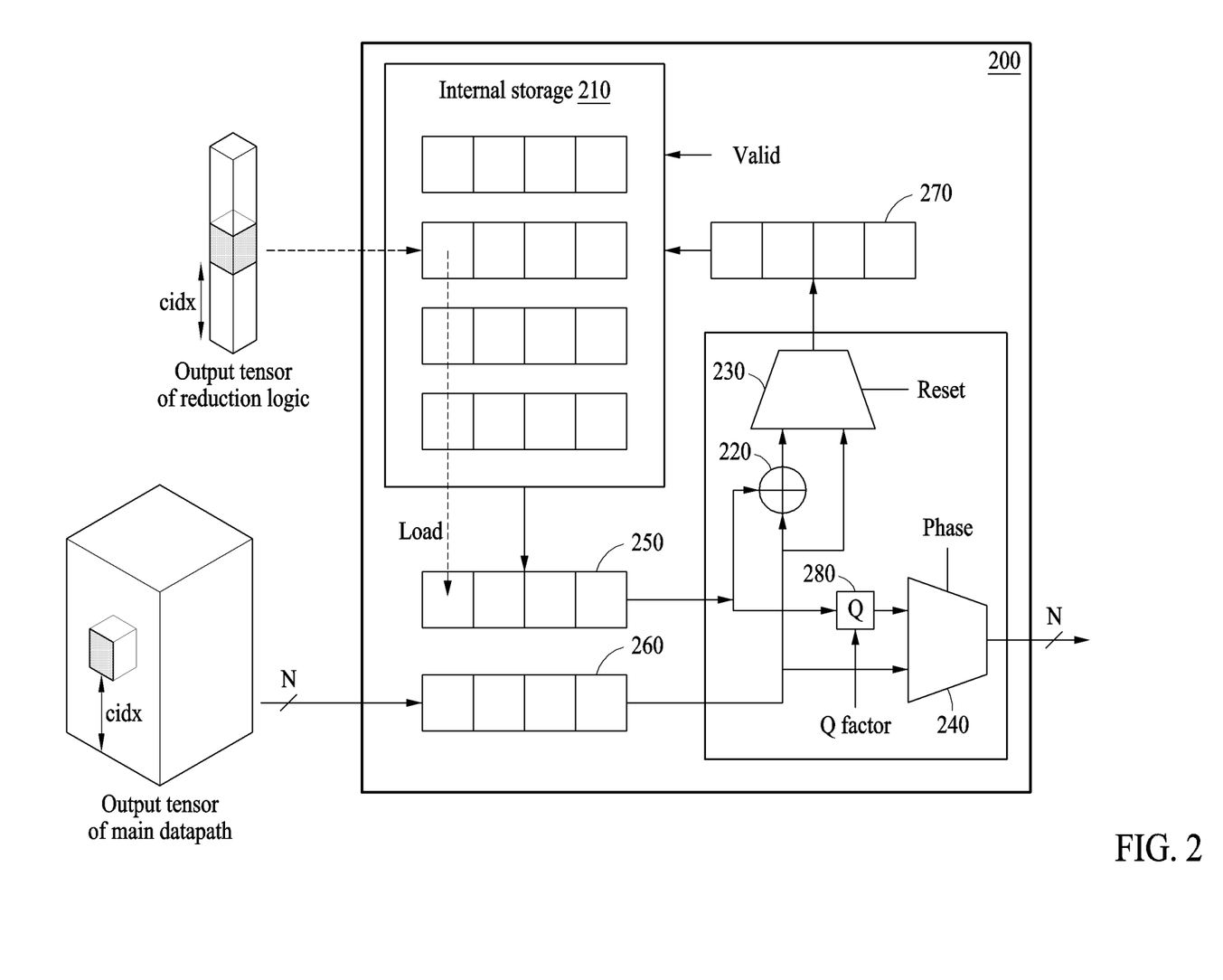
FIG. 2 illustrates an example of a reduction module shown in FIG. 1.

FIG. 2 illustrates an example of a reduction module shown in FIG. 1.

Referring to FIG. 2, a reduction module 200 may perform a pooling operation (for example, a global pooling operation). The reduction module 200 may include an internal storage 210, an adder 220, a first multiplexer 230, and a second multiplexer 240. The reduction module 200 may further include a first register 250, a second register 260, a third register 270, and a quantizer 280.

The internal storage 210 may store data for performing a neural network operation. The internal storage 210 may store data based on a channel index (for example, cidx of FIG. 2) indicating a position of an output tensor of the data.

The channel index may include input data desired to perform a reduction operation, and information on a position of an output tensor corresponding to the input data. A controller (for example, the controller 100 of FIG. 1) may store data in the internal storage 210 based on the channel index.

The adder 220 may perform addition of data and main data. The data may refer to data stored in the internal storage 210 and used inside the reduction module 200, and the main data may refer to data received from an output tensor of an external main datapath.

The first multiplexer 230 may output one of the main data and an output result of the adder 220, based on a reset signal. The second multiplexer 240 may output one of the main data and a quantization result of the data, based on a phase signal.

The controller 100 may control the first multiplexer 230 and the second multiplexer 240 by generating a reset signal and a phase signal. The phase signal may include a first phase signal that causes a neural network operation apparatus (for example, the neural network operation apparatus 10 of FIG. 1) not to perform an operation, a second phase signal to output the main data and update the internal storage 210, and the third phase signal to output a quantization result.

The phase signal may be a control signal desired to identify an operation of the reduction module 200 based on a phase. The reduction module 200 may operate in two or more modes based on the phase signal. A control in a compiler level may be desired to perform control based on the phase signal.

The phase signal may be a 2-bit signal. For example, the phase signal may be defined as below.

A. In case the first phase signal==2'b00/2'b11, the neural network operation apparatus 10 is in a no operation (NOP) state.

B. In case the second phase signal==2'b01, main phase: operate the main datapath and update the reduction module 200.

C. In case the third phase signal==2'b10, reduction phase: stop the main datapath. output the reduction module 200.

The controller 100 may update the internal storage 210 based on whether the main data is valid. The controller 100 may determine whether the main data is valid based on a valid value. The controller 100 may update the internal storage 210 only in case the main data received from the main datapath is valid based on the valid value.

The controller 100 may change the phase signal to the third phase signal when outputting of the main data is completed, receive data from the internal storage 210, based on the channel index, and output the data. For example, the controller 100 may change a phase to 2'b10 when the operation of the main datapath is completed in compiling, and may generate control code for reading and outputting the data of the internal storage 210 by transmitting an output channel value (for example, cidx).

The controller 100 may initialize the internal storage 210 using data for performing a neural network based on a reset signal. The data for initialization may be data received from the third register 270.

The controller 100 may initialize, without using the reset signal, the internal storage 210 to be 0 before a layer, which requires the performance of the reduction module 200, is performed. In this case, an output of the adder 220 may be directly transmitted to the internal storage 210 without using the first multiplexer 230.

The controller 100 may initialize the internal storage 210 by generating a reset signal at a time that a first output of a filter corresponding to the main data is generated. The reset signal may refer to a control signal to initialize a value of the internal storage 210 to be input data. The controller 100 may control the reduction module 200 by generating instructions and a control signal as a form of generating a reset signal when initially loading a filter or a first output of the filter being generated.

The first register 250 may receive the data from the internal storage 210 and store the data. The second register 260 may receive the main data and store the main data.

The quantizer 280 may generate a quantization result by quantizing the data based on a quantization factor. A quantization factor Q may be used to quantize an output value of the reduction module. The quantization factor may be pre-calculated before a neural network operation is performed.

The internal storage 210, the first register 250, the second register 260, and the third register 270 may be implemented in a memory. The memory may store instructions (or programs) executable by the processor. For example, the instructions may include instructions for executing an operation of the processor and/or instructions for performing an operation of each component of the processor.

The memory may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate Memory (NFGM), a holographic memory, a molecular electronic memory device), or an insulator resistance change memory.

Figure 3:
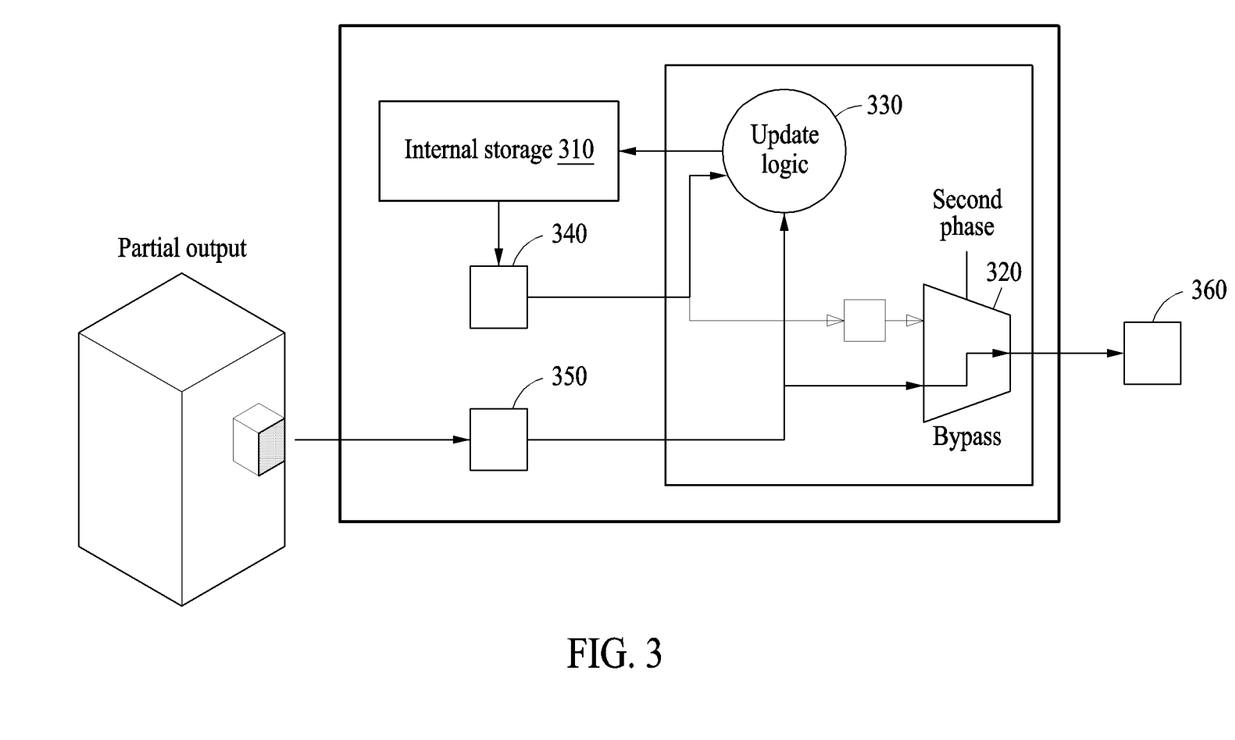
FIG. 3 illustrates an example of an operation of the neural network operation apparatus of FIG. 1.
Figure 4:
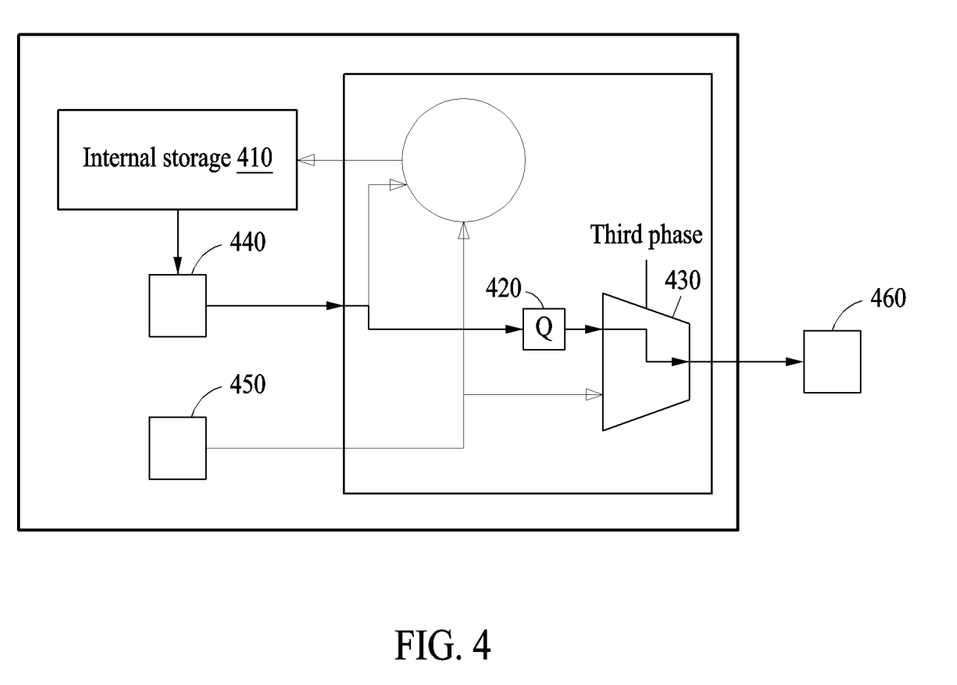
FIG. 4 illustrates an example of an operation of the neural network operation apparatus of FIG. 1.

FIG. 3 illustrates an example of an operation of the neural network operation apparatus of FIG. 1, and FIG. 4 illustrates an example of an operation of the neural network operation apparatus of FIG. 1.

Referring to FIGS. 3 and 4, a controller (for example, the controller 100 of FIG. 1) may control a reduction module (for example, the reduction module 200 of FIG. 1) based on a phase signal.

The controller 100 may control a second multiplexer 320 (for example, the second multiplexer 230 of FIG. 2) based on the phase signal. A second phase may refer to a phase to output data based on a main datapath.

The controller 100 may generate a second phase signal, and accordingly, the second multiplexer 320 may generate output data 360 by data stored in a second register 350 (for example, the second register 260 of FIG. 2) receiving main data from the main datapath.

In this case, the controller 100 may update an internal storage 310 (for example, the internal storage 210 of FIG. 2) using an update logic 330, and data stored in the internal storage 310 may be stored in a first register 340 (for example, the first register 250 of FIG. 2).

A third phase may refer to a phase to quantize and output data stored in an internal storage 410 (for example, the internal storage 210 of FIG. 2). A second multiplexer 430 may output output data 460 based on a third phase signal. The second multiplexer 430 (for example, the second multiplexer 240 of FIG. 2) may output a quantization result based on the third phase signal.

A first register 440 (for example, the first register 250 of FIG. 2) may receive the data from the internal storage 410 and store the data. The first register 440 may output the data to a quantizer 420 (for example, the quantizer 280 of FIG. 2).

The quantizer 420 may generate a quantization result of the data based on a quantization factor.

Figure 5:
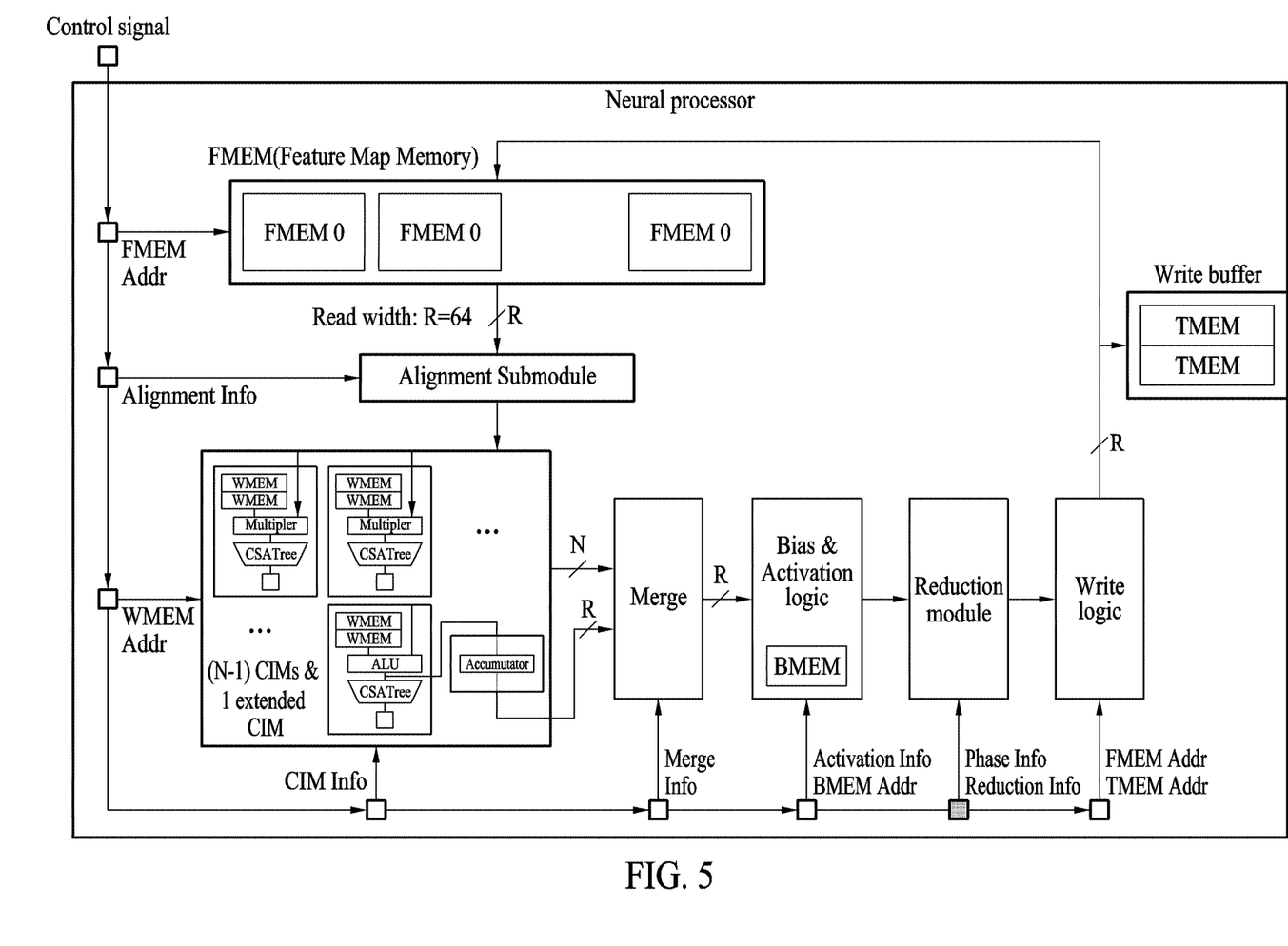
FIG. 5 illustrates an example of implementation of the neural network operation apparatus of FIG. 1.
Figure 6:
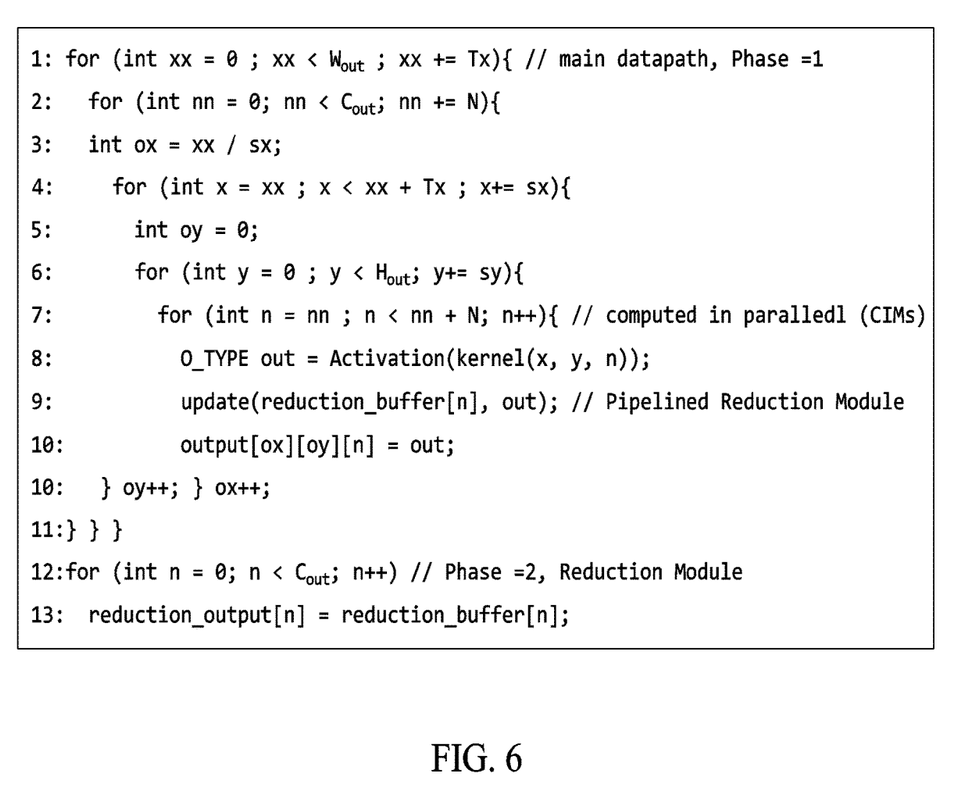
FIG. 6 illustrates an example of pseudo code for a pipeline process.
Figure 7:
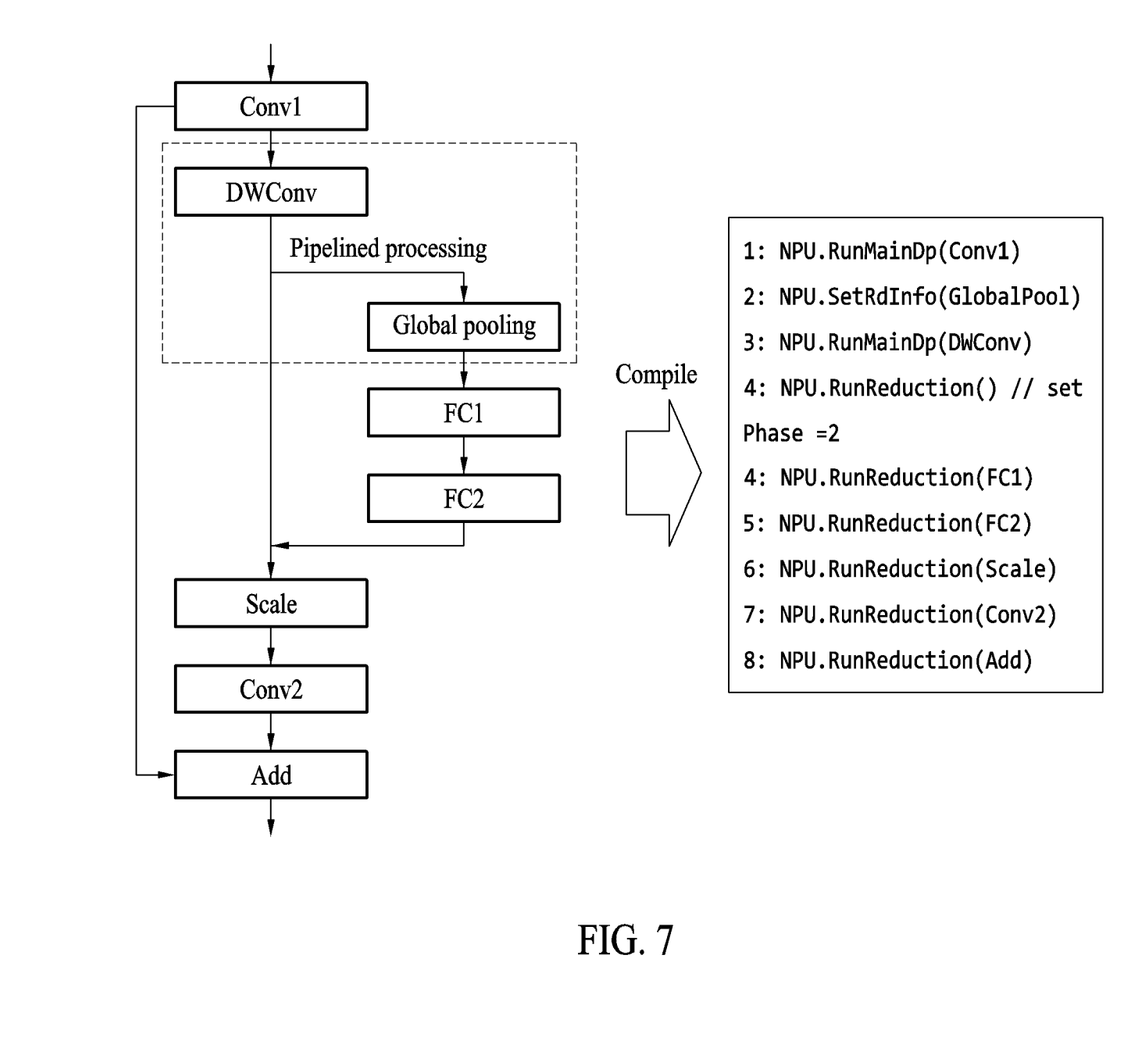
FIG. 7 illustrates an example of compilation to perform a neural network operation.

FIG. 5 illustrates an example of implementation of the neural network operation apparatus of FIG. 1, FIG. 6 illustrates an example of pseudo code for a pipeline process, and FIG. 7 illustrates an example of compilation to perform a neural network operation.

Referring to FIGS. 5 to 7, in case a reduction module (for example, the reduction module 200 of FIG. 1) is applied to an adder tree-based neural processor as shown in FIG. 5, data flow may be represented as shown in FIG. 6.

In an update phase (for example, the second phase) in which a main datapath is performed, an update of the reduction module 200 for an output may be performed as shown in line 9 of FIG. 6, and in a write phase (for example, the third phase), data of an internal storage (for example, the internal storage 210 of FIG. 2) may be output as shown in lines 12 to 13.

A compile result may be modified to support an operation performed by the reduction module 200. For example, information for the performance of the reduction module 200 may be additionally specified as shown in lines 2 and 4 of FIG. 7.

As an example of FIG. 7, since NPU.RunMainDp corresponds to NPU.Process of a conventional compile result, additional information processing may not be desired. In case the performance of the reduction module 200 is desired, a controller (for example, the controller 100 of FIG. 1) may set information (for example, a quantization factor) related to reduction before the reduction module 200 is executed.

Since a phase signal needs to be modified at a time that processing of the main data is completed, the phase may be modified as shown in line 4, and a line for outputting data stored in the reduction module 200 may be added.

In case there is no previous layer to be processed in the main datapath for the reduction operation and only the reduction module 200 is to be used, the controller 100 may process and output the data in the same ways as performing the Identity( ) function in the main datapath.

Figure 8A:
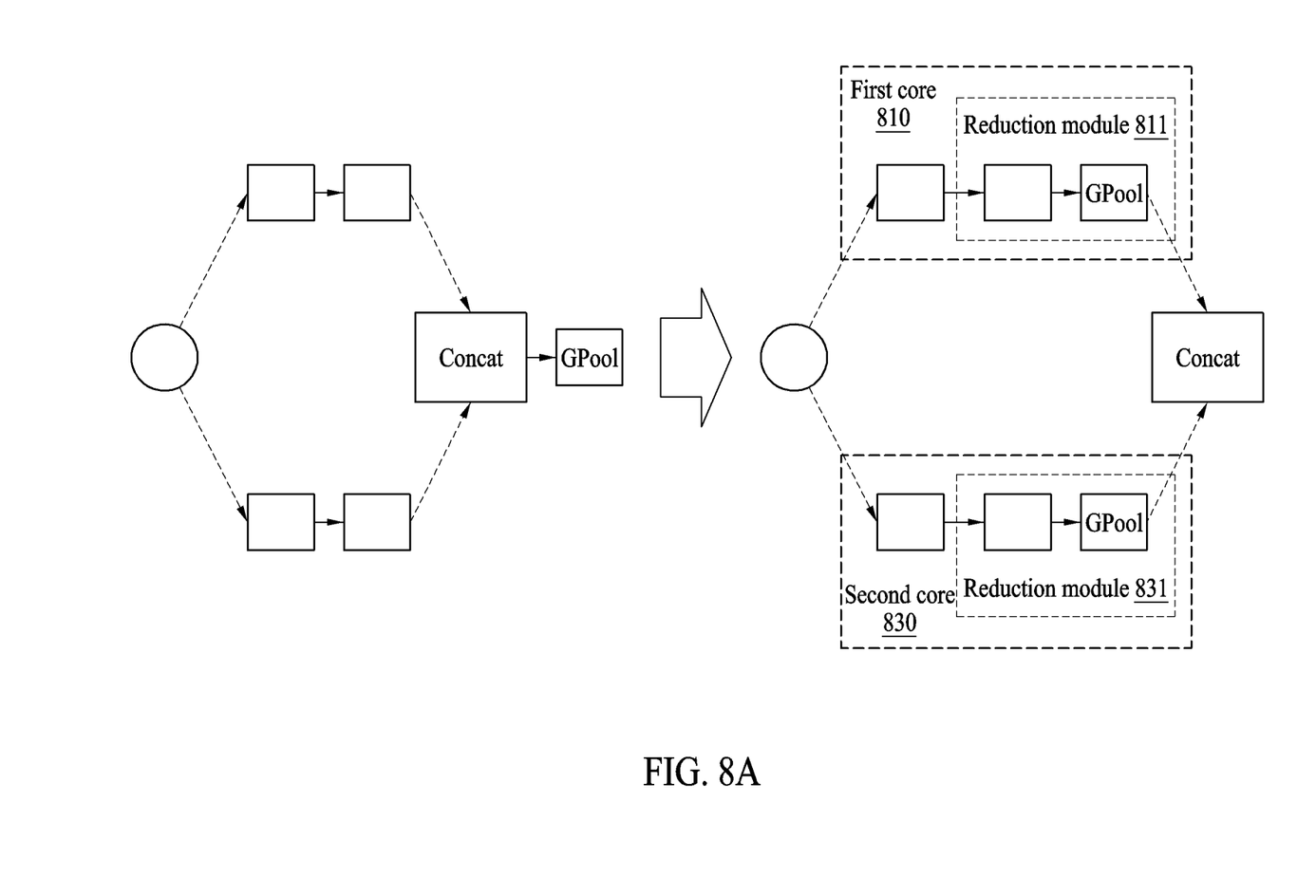
FIGS. 8A and 8B illustrate examples of distributed processing of a neural network operation.
Figure 8B:
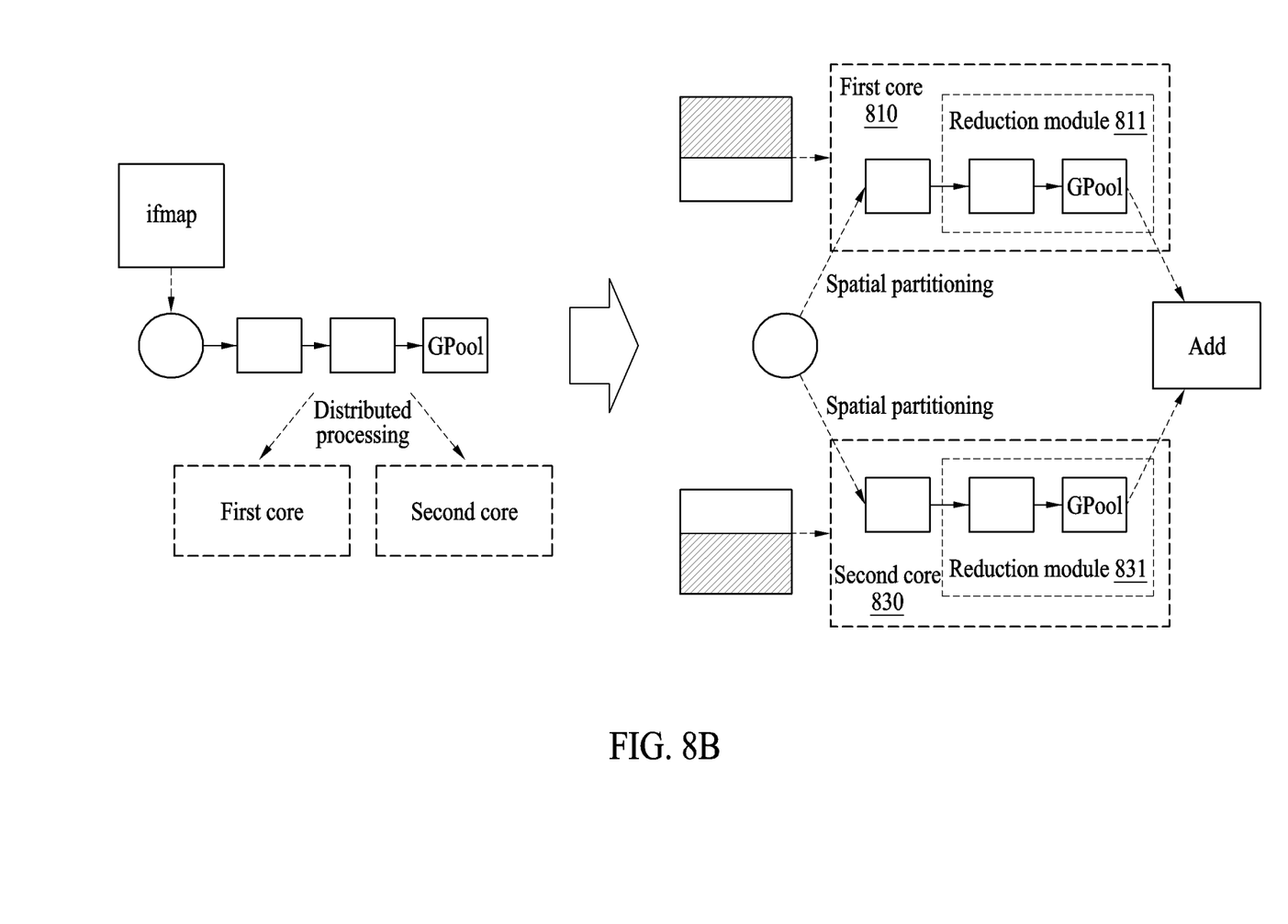

FIGS. 8A and 8B illustrate examples of distributed processing of a neural network operation.

Referring to FIGS. 8A and 8B, a neural network operation apparatus (for example, the neural network operation apparatus 10 of FIG. 1) may perform distributed processing using a plurality of cores (for example, a first core 810 and a second core 830). In case distributed processing is available since input data is divided in a channel direction or global pooling is performed on a final output on which concatenation operation is performed, a reduction operation is performed in different cores before a concatenation operation is performed as shown in FIG. 8A. By performing concat, an operation load may be significantly reduced.

For example, the neural network operation apparatus 10 may concatenate an output of the reduction module 811 and an output of the reduction module 831 after the first core 810 performs a reduction operation using a reduction module 811 and the second core 830 performs the reduction operation using a reduction module 831.

Referring to an example of FIG. 8B, in case a layer sequence including global pooling needs to be processed in a multi-core based on spatial partitioning to reduce loads of the first and second cores 810 and 830, the neural network operation apparatus 10 may perform an operation by summing reduction operation result values after processing global pooling by partitions using the reduction modules 811 and 831 without performing standalone global pooling after summing operation result values.

In this case, a quantization factor of the reduction modules 811 and 831 may not be a value corresponding to a partitioned neural network, and a quantization factor of an existing neural network may be used. For example, in case Core0 represents the first core 810 and Core 1 represents the second core 830, a quantization factor may be calculated using NC (Core 0)+B/C (Core 1)=(A+B)/C (Core 0+Core 1: an existing result value). A may represent a sum of outputs of the first core 810 and B may represent a sum of outputs of the second core 830. C may represent a quantization factor determined in a global average pooling layer before being partitioned.

Figure 9:
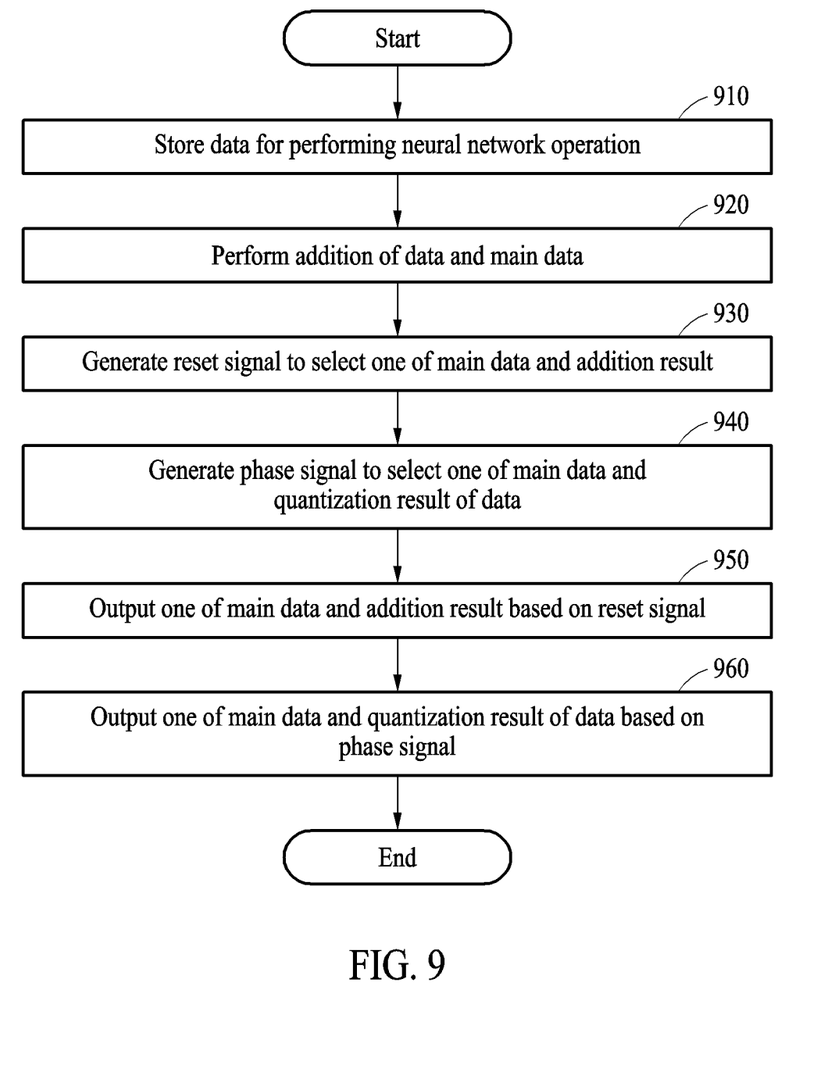
FIG. 9 illustrates an example of an operation of the neural network operation apparatus of FIG. 1.

FIG. 9 illustrates an example of an operation of the neural network operation apparatus of FIG. 1.

Referring to FIG. 9, in operation 910, an internal storage (for example, the internal storage 210 of FIG. 2) may store data for performing a neural network operation. The internal storage 210 may store data based on a channel index indicating a position of an output tensor of the data.

A first register (for example, the first register 250 of FIG. 2) may receive the data from the internal storage 210, in which the data is stored, and store the data.

A second register (for example, the second register 260 of FIG. 2) may receive main data and store the main data. A third register (for example, the third register 270 of FIG. 3) may store a selected one of an addition result and the main data.

In operation 920, an adder (for example, the adder 220 of FIG. 2) may perform addition of the data and the main data.

In operation 930, a controller (for example, the controller 100 of FIG. 1) may generate a reset signal to select one of the addition result and the main data. The controller 100 may initialize, based on the reset signal, the internal storage 210 to data for performing a neural network operation. The controller 100 may initialize the internal storage 210 by generating the reset signal at a time that a first output of a filter corresponding to the main data is generated.

In operation 930, the controller 100 may generate a phase signal to generate one of the main data and a quantization result of the data. In operation 940, the controller 100 may generate a phase signal to select one of the main data and the quantization result of the data.

The phase signal may include a first phase signal that causes a neural network operation apparatus not to perform an operation, a second phase signal to output main data and update the internal storage, and the third phase signal to output a quantization result.

The controller 100 may update the internal storage 210 based on whether the main data is valid. The controller 100 may change the phase signal to the third phase signal at a time that outputting of the main data is completed. The controller 100 may receive the data from the internal storage 210, based on a channel index, and output the data.

In operation 950, a first multiplexer (for example, the first multiplexer 930 of FIG. 2) may output one of an addition result and the main data based on the reset signal.

In operation 960, a second multiplexer (for example, the second multiplexer 930 of FIG. 2) may output one of the main data and the quantization result of the data based on the phase signal.

A quantizer (for example, the quantizer 280 of FIG. 2) may generate a quantization result by quantizing the data based on a quantization factor.

The neural network operation apparatus, controller, reduction module, neural network operation apparatus 10, controller 100, and reduction module 200 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network operation apparatus comprising:
   an adder configured to perform addition of data for performing a neural network operation and main data;
   a first multiplexer configured to output one of an output result of the adder and the main data based on a reset signal;
   a second multiplexer configured to output one of the main data and a quantization result of the data based on a phase signal; and
   a controller configured to control the first and second multiplexers by generating the reset signal and the phase signal.

2. The neural network operation apparatus of claim 1, further comprising an internal storage configured to store the data for performing the neural network operation.

3. The neural network operation apparatus of claim 2, further comprising:

a first register configured to receive the data from the internal storage and store the data;
a second register configured to receive the main data and store the main data; and
a third register configured to store the output of the first multiplexer.

4. The neural network operation apparatus of claim 1, further comprising:
a quantizer configured to generate the quantization result by quantizing the data based on a quantization factor.

5. The neural network operation apparatus of claim 2, wherein the internal storage is further configured to store the data based on a channel index indicating a position of an output tensor of the data.

6. The neural network operation apparatus of claim 2, wherein the controller is further configured to update the internal storage based on whether the main data is valid.

7. The neural network operation apparatus of claim 2, wherein the phase signal comprises:
a first phase signal to cause the neural network operation apparatus not to perform an operation;
a second phase signal to output the main data and update the internal storage; and
a third phase signal to output the quantization result.

8. The neural network operation apparatus of claim 7, wherein the controller is further configured to:
change the phase signal to the third phase signal when outputting of the main data is completed; and
receive the data from the internal storage, based on a channel index, and output the data.

9. The neural network operation apparatus of claim 2, wherein the controller is further configured to initialize the internal storage to the data based on the reset signal.

10. The neural network operation apparatus of claim 2, wherein the controller is further configured to initialize the internal storage by generating the reset signal when a first output of a filter, corresponding to the main data, is generated.

11. A neural network operation method comprising:
performing addition of a data for performing a neural network operation and main data;
generating a reset signal to select one of an addition result and the main data;
generating a phase signal to select one of the main data and a quantization result of the data;
outputting one of the addition result and the main data based on the reset signal; and
outputting one of the main data and the quantization result of the data based on the phase signal.

12. The neural network operation method of claim 11, further comprising:
receiving the data from an internal storage in which the data is stored and storing the data;
receiving and storing the main data; and
storing selected one of the addition result and the main data.

13. The neural network operation method of claim 11, wherein the outputting of the one of the main data and the quantization result of the data based on the phase signal comprises generating the quantization result by quantizing the data based on a quantization factor.

14. The neural network operation method of claim 11, further comprising:
storing the data based on a channel index indicating a position of an output tensor of the data.

15. The neural network operation method of claim 11, further comprising:
updating an internal storage configured to store the data based on whether the main data is valid.

16. The neural network operation method of claim 11, wherein the phase signal comprises:
a first phase signal to cause a neural network operation apparatus not to perform an operation;
a second phase signal to output the main data and update an internal storage configured to store the data; and
a third phase signal to output the quantization result.

17. The neural network operation method of claim 16, further comprising:
changing the phase signal to the third phase signal when outputting of the main data is completed; and
receiving the data from the internal storage based on a channel index and outputting the data.

18. The neural network operation method of claim 11, further comprising:
initializing an internal storage to the data based on the reset signal, the internal storage being configured to store the data.

19. The neural network operation method of claim 11, wherein the generating of the reset signal comprises initializing an internal storage configured to store the data, by generating the reset signal when a first output of a filter corresponding to the main data is generated.

20. A non-transitory computer-readable storage medium storing instructions that, when executed by a processor, configure the processor to perform the method of claim 11.

* * * * *